(12) United States Patent
Bondu et al.

(10) Patent No.: US 9,713,942 B2
(45) Date of Patent: *Jul. 25, 2017

(54) TIRE COMPRISING A TREAD FORMED BY MULTIPLE ELASTOMER BLENDS

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Lucien Bondu, Clermont-Ferrand (FR); Francois Harle, Clermont-Ferrand (FR); Olivier Goncalves, Clermont-Ferrand (FR); Cecile Belin, Clermont-Ferrand (FR)

(73) Assignees: Compagnie Generale des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 263 days.

This patent is subject to a terminal disclaimer.

(21) Appl. No.: 14/412,364

(22) PCT Filed: Jun. 27, 2013

(86) PCT No.: PCT/EP2013/063540
§ 371 (c)(1),
(2) Date: Dec. 31, 2014

(87) PCT Pub. No.: WO2014/005929
PCT Pub. Date: Jan. 9, 2014

(65) Prior Publication Data
US 2015/0136287 A1    May 21, 2015

(30) Foreign Application Priority Data
Jul. 5, 2012  (FR) .................... 12 56489

(51) Int. Cl.
*B60C 11/00*  (2006.01)
*B60C 1/00*   (2006.01)
*B60C 11/03*  (2006.01)

(52) U.S. Cl.
CPC .......... *B60C 11/033* (2013.01); *B60C 11/005* (2013.01); *B60C 11/0058* (2013.04);
(Continued)

(58) Field of Classification Search
CPC ............... B60C 1/0016; B60C 11/0008; B60C 2011/0016; B60C 2011/0025;
(Continued)

(56) References Cited

U.S. PATENT DOCUMENTS 6,247,512 B1 †  6/2001  Radulescu
6,412,532 B1    7/2002  Iida et al.
(Continued)

FOREIGN PATENT DOCUMENTS

DE    102011001133 A1    9/2012
EP        1016555 A2     7/2000
(Continued)

OTHER PUBLICATIONS

International Search Report for PCT/EP2013/063540 dated Oct. 23, 2013.
(Continued)

*Primary Examiner* — Eric Hug
(74) *Attorney, Agent, or Firm* — Dickinson Wright PLLC

(57) ABSTRACT

A tire with a radial carcass reinforcement, having a crown reinforcement, itself capped radially by a tread connected to two beads by two sidewalls, the tread having at least two layers of blended elastomeric compounds that are radially superposed and have a voids ratio that is lower in the central part than at the axially outer parts. A first layer of blended elastomeric compounds of the tread is made up of a first blended elastomeric compound forming a part extending at least into the region of the equatorial plane and of at least two axially outer parts formed of a second blended elastomeric compound, the first blended elastomeric compound
(Continued)

having a macro dispersion Z-value higher than 65 and a maximum tan(δ) value, denoted tan(δ)max, lower than 0.150, and the second blended elastomeric compound having a maximum tan(δ) value, denoted tan(δ)max, lower than 0.130.

15 Claims, 2 Drawing Sheets

(52) U.S. Cl.
CPC ... *B60C 11/0075* (2013.04); *B60C 2011/0016* (2013.04); *B60C 2011/0025* (2013.04)

(58) Field of Classification Search
CPC ......... B60C 2011/0033; B60C 11/0041; B60C 11/005; B60C 11/0058; B60C 11/0066; B60C 11/0075; B60C 11/033; B60C 11/0032
USPC .................................. 152/209.3, 209.5, 905
See application file for complete search history.

(56) References Cited

U.S. PATENT DOCUMENTS 6,872,772 B2 † 3/2005 Steiner

2012/0298271 A1* 11/2012 Bijaoui ............... B60C 11/0309
152/209.25
2013/0303687 A1* 11/2013 Thomasson .............. C08J 3/226
524/575.5

FOREIGN PATENT DOCUMENTS

| FR | 2952855 A1 | 5/2011 |
|----|----|----|
| WO | 9736724 A2 † | 10/1997 |
| WO | 2011034585 A2 † | 3/2011 |
| WO | 2011064056 A1 † | 6/2011 |
| WO | WO 2011/064056 * | 6/2011 |
| WO | 2012080111 A1 † | 6/2012 |
| WO | WO 2012/080111 * | 6/2012 |

OTHER PUBLICATIONS

Anonymous: "Rubber Testing Technologies—Carbon Black Dispersion Tester", Qualitest, Nov. 7, 2006, pp. 1-16 XP002714013, Internet URL:www.worloftest.com/pdf/rubber.pdf [Oct. 1, 2013] p. 9.
Kirk-Othmer Encyclopedia of Chemical Technology, pp. 761, 755-778, vol. 4, 5th Edition, Wiley & Sons, New Jersey, Mar. 2004.†

\* cited by examiner
† cited by third party

TIRE COMPRISING A TREAD FORMED BY MULTIPLE ELASTOMER BLENDS

This application is a 371 national phase entry of PCT/EP2013/063540, filed 27 Jun. 2013, which claims benefit of French Patent Application No. 1256489, filed 5 Jul. 2012, the entire contents of which are incorporated herein by reference for all purposes.

BACKGROUND

1. Field

The disclosure relates to a tire with a radial carcass reinforcement intended to be fitted to a heavy vehicle such as a transport vehicle or an "industrial" vehicle. It is notably a tire that has an axial width greater than 37 inches.

Although not limited to this type of application, the disclosure will be more particularly described with reference to a vehicle of the "dumper" type weighing in excess of 300 tonnes, fitted with tires of a diameter greater than three meters fifty with an axial width greater than 37 inches.

2. Description of Related Art

Such a tire, intended in general to carry heavy loads, comprises a radial carcass reinforcement and a crown reinforcement made up of at least two working crown plies formed of inextensible reinforcing elements which are crossed from one ply to the next and make equal or unequal angles of between 10 and 45° with the circumferential direction.

As far as the usual design of tires for industrial vehicles is concerned, the radial carcass reinforcement, which is anchored in each bead, is made up of at least one layer of metal reinforcing elements, the said elements being substantially parallel to one another within the layer. The carcass reinforcement is usually surmounted by a crown reinforcement made up of at least two working crown layers of metal reinforcing elements, these however being crossed from one layer to the next and making angles of between 10 and 65° with the circumferential direction. Between the carcass reinforcement and the working crown layers there are usually two layers of reinforcing elements, crossed one ply to the next and at angles smaller than 12°; the width of these layers of reinforcing elements is usually less than those of the working layers. Radially on the outside of the working layers there are also protective layers the reinforcing elements of which are at angles of between 10 and 65°.

Radially on the outside of the crown reinforcement is the tread usually made up of polymeric materials intended to come into contact with the ground in the contact patch in which the tire is in contact with the ground.

Cords are said to be inextensible when the said cords exhibit, under a tensile force equal to 10% of the breaking force, a relative elongation at most equal to 0.2%.

Cords are said to be elastic when the said cords exhibit, under a tensile force equal to the breaking load, a relative elongation at least equal to 3% with a maximum tangent modulus of less than 150 GPa.

The circumferential direction of the tire, or longitudinal direction, is the direction corresponding to the periphery of the tire and defined by the direction of running of the tire.

The axis of rotation of the tire is the axis about which it turns in normal use.

A radial or meridian plane is a plane containing the axis of rotation of the tire.

The circumferential median plane, or equatorial plane, is a plane perpendicular to the axis of rotation of the tire and which divides the tire into two halves.

The transverse or axial direction of the tire is parallel to the axis of rotation of the tire. An axial distance is measured in the axial direction. The expression "axially on the inside of or, respectively, axially on the outside of" means "of which the axial distance, measured from the equatorial plane, is less than or, respectively, greater than".

The radial direction is a direction that intersects the axis of rotation of the tire and is perpendicular thereto. A radial distance is measured in the radial direction. The expression "radially on the inside of or, respectively, radially on the outside of" means "of which the radial distance, measured from the axis of rotation of the tire, is less than or, respectively, greater than".

In the case of vehicles, notably those intended for use in mines or quarries for transporting loads, the difficulties regarding access routes and profitability requirements lead the manufacturers of these vehicles to increase their load-carrying capability. It then follows that the vehicles become increasingly large and, therefore, increasingly heavy themselves so that they can transport an increasingly heavy load. At the present time, these vehicles may reach weights of several hundreds of tonnes and so may the weight of the load to be transported; the overall weight may therefore be as much as 600 tonnes.

Increasing demands are therefore placed on the tires. The tires have simultaneously to exhibit good performance in terms of wear, be capable of transporting the necessary torque and of withstanding the attack notably from rocks encountered on the tracks.

Document FR 1445678 thus proposes choosing different materials in the axial direction for forming the tread. The central part may be made up of a more wear-resistant material than the lateral parts.

Wear-resistant materials usually carry a penalty in terms of hysteresis properties. Thus it is also known practice for the tread of a tire to be made of a radial superposition of two different materials in order to reach a compromise between wear properties and hysteresis properties that is satisfactory for the envisaged applications.

Such tires are, for example, described in document U.S. Pat. No. 6,247,512. That document describes the superposition of two layers of materials in order to form the tread, the outer material coming into contact with the ground notably exhibiting better performance in terms of wear whereas the inner material has hysteresis properties that make it possible to limit increases in tire temperature in the crown region.

With this type of tire, the patterns present on the tread may also vary in the axial direction; thus it is known practice to have a lower voids ratio in the central part in order to transmit torque, and also avoid attack in the central part where rocks are more difficult to remove.

The voids ratio of the tread is defined according to the invention by the ratio of the surface area of sipes or grooves to the total area of the tread. The voids ratio of a part of the tread is thus defined according to the invention by the ratio of the surface area of sipes or grooves present in the said part of the tread, to the total surface area of the said part of the tread.

SUMMARY

The inventors set themselves the task of providing tires with an even better compromise between the performance aspects of wear and endurance.

According to an embodiment of the invention, this object has been achieved using a tire with a radial carcass reinforcement, comprising a crown reinforcement, itself capped radially by a tread connected to two beads by two sidewalls, the tread comprising at least two layers of blended elastomeric compounds that are radially superposed and have a voids ratio that is lower in the central part than at the axially outer parts, a first layer of blended elastomeric compounds of the tread being made up of a first filled blended elastomeric compound forming a part extending at least into the region of the equatorial plane and of at least two axially outer parts formed of a second blended elastomeric compound, the first filled blended elastomeric compound having a macro dispersion Z-value higher than 65 and a maximum tan(δ) value, denoted tan(δ)max, lower than 0.150, and the second blended elastomeric compound having a maximum tan (δ) value, denoted tan (δ) max, lower than 0.130.

A macro dispersion Z-value higher than 65 for a filled blended elastomeric compound means that the filler is dispersed in the elastomeric matrix of the composition with a dispersion Z-value of 65 or higher.

In the present description, the dispersion of filler in an elastomeric matrix is characterized by the Z-value which is measured, after crosslinking, using the method described by S. Otto et al in Kautschuk Gummi Kunststoffe, 58 Jahrgang, N R 7-8/2005, which is consistent with ISO standard 11345.

The Z-value calculation is based on the percentage of surface area in which the filler is not dispersed ("non-dispersed % area") as measured by the "disperGRADER+" device supplied with its operating procedure and "disperDATA" exploitation software by the company Dynisco, using the equation:

$$Z=100-(\text{non-dispersed \% area})/0.35$$

The non-dispersed percentage area is itself measured using a camera that looks at the surface of the specimen under light incident at an angle of 30°. Light-colored points are associated with filler and agglomerations, while dark points are associated with the rubber matrix; a digital processing operation converts the image into a black-and-white image and allows the percentage of non-dispersed area to be determined, in the way described by S. Otto in the abovementioned document.

The higher the Z-value, the better the dispersion of the filler in the rubber matrix (a Z-value of 100 corresponding to a perfect dispersion and a Z-value of 0 to a mediocre dispersion). A Z-value of 65 or higher is considered to correspond to a good dispersion of the filler in the elastomeric matrix.

The blended elastomeric compounds of which the tread is made up are prepared using known methods.

In order to achieve a macro dispersion Z-value higher than 65, the blended elastomeric compound that makes up the radially outer part may advantageously be prepared by forming a master batch of diene elastomer and reinforcing filler.

Within the meaning of the disclosure a "master batch" means an elastomer-based composite into which a filler has been introduced.

There are various ways of obtaining a master batch of diene elastomer and reinforcing filler. In particular, one type of solution is, in order to improve the dispersion of the filler in the elastomer matrix, to mix the elastomer and the filler in the "liquid" phase. To do that, use is made of an elastomer in the form of a latex which takes the form of particles of elastomer dispersed in water, and of an aqueous dispersion of the filler, namely a filler dispersed in water and commonly referred to as a "slurry".

Thus, according to one of the alternative forms of the invention, the master batch is obtained by liquid-phase mixing from a diene elastomer latex containing natural rubber and an aqueous dispersion of a filler containing carbon black.

More preferably still, the master batch according to an embodiment of the invention is obtained using the following process steps, that make it possible to obtain very good dispersion of the filler in the elastomer matrix:

supplying a continuous first stream of a diene elastomer latex to a mixing zone of a coagulation reactor defining an elongate coagulation zone extending between the mixing zone and an outlet, supplying the said mixing zone of the coagulation reactor with a second continuous stream of a fluid containing a filler under pressure in order to form a mixture with the elastomer latex by mixing the first fluid and the second fluid in the mixing zone vigorously enough to cause the elastomer latex to coagulate with the filler before the outlet, the said mixture flowing as a continuous stream towards the outlet zone and the said filler being capable of coagulating the elastomer latex, collecting at the outlet to the reactor the coagulum obtained previously in the form of a continuous stream and drying it in order to recover the master batch.

A method of preparing a master batch in the liquid phase is described for example in document WO 97/36724.

The loss factor tan(δ) is a dynamic property of the layer of blended rubber compound. It is measured using a viscoanalyser (Metravib VA4000) in accordance with standard ASTM D 5992-96. The response of a sample of vulcanized composition (cylindrical test specimen 4 mm thick and 400 mm$^2$ in cross section), subjected to simple alternating sinusoidal shear stressing at a frequency of 10 Hz, and a temperature of 100° C. is recorded. The amplitude of deformation sweeps from 0.1 to 50% (in the outbound cycle) and then from 50% to 1% (in the return cycle). The results exploited are the complex dynamic shear modulus (G*) and the loss factor tan(δ). In the return cycle, the maximum observed value of tan(δ), denoted tan(δ)$_{max}$ is indicated.

The rolling resistance is the resistance that arises when the tire is rolling and indicates the rising temperature of the tire. It is thus represented by hysteresis losses associated with the deformation of the tire over one revolution. The tan(δ) values for the materials used are measured at 10 Hz between 30 and 100° C. in order to incorporate the effect of the various frequencies of deformation caused by the turning of the tire. The value of tan(δ) at 100° C. thus corresponds to an indication of the rolling resistance of the tire during running.

The tearability indexes are measured at 100° C. In particular, the force that has to be exerted in order to obtain breakage (FRD) is determined in N/mm of thickness and the elongation at rupture (ARD) is measured as a percentage on a test specimen measuring 10×105×2.5 mm notched at its centre along its length over a depth of 5 mm.

The various measurements are taken on new tires that have not yet been run at all.

According to a preferred embodiment of the invention, the voids ratio of the central part of the tread is between 2 and 15% and, for preference, less than 10%.

For preference also, the voids ratio of the axially outer parts of the tread is between 20 and 40% and preferably less than 30%.

The inventors have been able to demonstrate that the combination of a first filled blended elastomeric compound having a macro dispersion Z-value higher than 65 and a maximum tan (δ) value, denoted tan (δ) max, lower than 0.150, by way of material for the central part of the first layer of the tread coinciding at least in part with the region with the lowest voids ratio and of a second blended elastomeric compound having a maximum tan (δ) value, denoted tan (δ) max, lower than 0.130, by way of material for the axially outer parts of the tread coinciding at least in part with the region of highest voids ratio leads to a compromise between wear resistance and endurance.

Specifically, as mentioned previously, the voids ratio in the middle of the tread is lower by comparison with the axially outer parts. This reduction in the voids ratio in the central part of the tread makes it possible to safeguard the crown reinforcement from attack, it notably being a tricky business to remove stones from this central part of the tread.

Next, choosing the first filled blended elastomeric compound with a macro dispersion Z-value higher than 65 as the material for the central part of the tread leads to wearing properties that are particularly advantageous in terms of the use of such tires, the inventors having been able to demonstrate that the most pronounced wear occurs in the central part of the tread, which is the part most heavily loaded when transmitting torque.

Next, choosing the first filled blended elastomeric compound as the material for the central part of the tread, having a tan (δ) max value lower than 0.150, and choosing the second filled blended elastomeric compound as the material for the axially outer parts of the tread, having a tan (δ) max value lower than 0.130, lead to hysteresis properties that favor lower heating of the tire and thus better tire endurance.

Choosing these blended elastomeric compounds may also make it possible to reduce the operating temperature of the tire in the crown region in order to make it possible to lower the rolling resistance of the tire.

According to a preferred embodiment of the invention, the first blended elastomeric compound forming a part that extends at least into the region of the equatorial plane of the first layer of blended elastomeric compounds contains, by way of reinforcing filler, at least a carbon black with a BET specific surface area higher than 120 m$^2$/g, used in a proportion of between 10 and 70 phr.

For preference also, the reinforcing filler of the first blended elastomeric compound forming a part that extends at least into the region of the equatorial plane of the first layer of blended elastomeric compounds contains by way of reinforcing filler a cut of carbon black as described hereinabove and of a white filler, the overall level of filler being between 10 and 90 phr and the ratio of carbon black to white filler being higher than 2.7.

The selection of the fillers as described hereinabove makes it possible further to improve the wear resistance properties of the first blended elastomeric compound of the first layer of blended elastomeric compounds.

Advantageously also according to an embodiment of the invention, the complex dynamic shear modulus G* 1% at 100° C. of the first blended elastomeric compound forming a part that extends at least into the region of the equatorial plane of the first layer of blended elastomeric compounds is higher than 2.30.

According to a first embodiment of the invention, the tire according to the invention comprising at least two radially superposed layers of blended elastomeric compounds, the first layer as previously described and comprising a first blended elastomeric compound forming a part that extends at least into the region of the equatorial plane and at least two axially outer parts formed of a second blended elastomeric compound, forms the radially outer layer of the tread, which layer is intended to come into contact with the ground.

According to this first embodiment, the second layer of blended elastomeric compound radially on the inside of and in contact with the said first layer is advantageously made up of a blended elastomeric compound having a tan (δ) max value lower than 0.130.

Advantageously also, the second layer of blended elastomeric compound radially on the inside of and in contact with the said first layer is made up of a blended elastomeric compound identical to the second blended elastomeric compound forming the axially outer parts of the first layer of blended elastomeric compounds.

The presence of this second blended elastomeric compound radially on the inside of the first layer and notably of the central part thereof may make it possible to further limit the heating of the tire and thus lead to even better tire endurance.

According to a second embodiment of the invention, the tire according to the invention comprising at least two radially superposed layers of blended elastomeric compounds, the first layer as previously described, and comprising a first blended elastomeric compound forming a part extending at least into the region of the equatorial plane and at least two axially outer parts formed of a second blended elastomeric compound, forms a radially inner layer of the tread. Such a layer of the tread is intended to come into contact with the ground only after the said tread has been worn away by a given amount that has caused the radially outermost layer or layers to disappear.

According to this second embodiment, the radially outer second layer of blended elastomeric compound preferably in contact with the said first layer is advantageously made up of a blended elastomeric compound having a macro dispersion Z-value higher than 65 and a maximum tan(δ) value, denoted tan(δ)max; lower than 0.150.

Advantageously also, the radially outer second layer of blended elastomeric compound in contact with the said first layer is made up of a blended elastomeric compound identical to the first blended elastomeric compound forming the central part of the said first layer of blended elastomeric compounds.

The presence of this first blended elastomeric compound radially on the outside of the first layer and notably of the axially outer parts thereof may make it possible to improve the wear resistance properties of the tread. The inventors have been able to demonstrate that under cornering, the axially outer parts of the tires of industrial vehicles of the dumper type with an axial width greater than 37 inches are subjected to particularly severe stress loadings. It also proves to be the case that the severity of these stress loadings varies with tire size, stress loadings notably increasing in line with the ratio of side wall height to tire width.

The thickness of this second layer of blended elastomeric compound according to this second embodiment of the invention may thus advantageously vary according to the size of the tire. According to an embodiment of the invention, the thickness of this second layer forming the radially outer part of the tread advantageously decreases as tire width increases. It is furthermore advantageously defined so that it disappears following wear that has led to an appreciable reduction in the stress loadings leading to reduced mobility of the tread blocks in the pattern and an increase in the transverse rigidity of the tire which are favorable under cornering.

For tires of 57 inches or less (diameter measured between the base of the beads of the tire), the thickness, measured in the radial direction at the end of what in a meridian section of the tire is the radially outermost working layer, of the second layer of blended elastomeric compound according to this second embodiment of the invention is preferably greater than 50% of the thickness, measured in the radial direction at the end of what in a meridian section of the tire is the radially outermost working layer, of the first layer of blended elastomeric compound.

For tires larger than 57 inches (diameter measured between the base of the beads of the tire), the thickness, measured in the radial direction at the end of what in a meridian section of the tire is the radially outermost working layer, of the second layer of blended elastomeric compound according to this second embodiment of the invention is preferably greater than 10% of the thickness, measured in the radial direction at the end of what in a meridian section of the tire is the radially outermost working layer, of the first layer of blended elastomeric compound.

For preference also according to this second embodiment of the invention, the tread comprises a third layer of blended elastomeric compound radially on the inside of and in contact with the said first layer, advantageously made up of a blended elastomeric compound having a tan (δ) max value lower than 0.130.

Advantageously also, the third layer of blended elastomeric compound radially on the inside of and in contact with the said first layer is made up of a blended elastomeric compound identical to the second blended elastomeric compound forming the axially outer parts of the said first layer of blended elastomeric compounds.

As in the first embodiment, such a radially inner layer makes it possible to have a blended elastomeric compound that makes it possible to limit the heading of the tire and thus improve the endurance thereof.

Because the overall thickness of the tread is defined by parameters connected with the desire and use of the tires, the thickness of the various layers that make up the tread has to vary with the size of the tire as mentioned previously.

For tires of 57 inches or less (diameter measured between the base of the beads of the tire), the thickness, measured in the radial direction at the end of what in a meridian section of the tire is the radially outermost working layer, of the third layer of blended elastomeric compound according to this second embodiment of the invention is preferably greater than 25% of the thickness, measured in the radial direction at the end of what in a meridian section of the tire is the radially outermost working layer, of the first layer of blended elastomeric compound.

For tires larger than 57 inches (diameter measured between the base of the beads of the tire), the thickness, measured in the radial direction at the end of what in a meridian section of the tire is the radially outermost working layer, of the third layer of blended elastomeric compound according to this second embodiment of the invention is preferably greater than 35% of the thickness, measured in the radial direction at the end of what in a meridian section of the tire is the radially outermost working layer, of the first layer of blended elastomeric compound.

One advantageous alternative form of the invention according to either one of the embodiments mentioned hereinabove, also provides for the presence of an additional layer of a blended elastomeric compound in a radially innermost position in the tread and therefore in contact with the crown reinforcement of the tire, having a maximum tan(δ) value, denoted tan(δ)max, lower than 0.100.

The presence of this additional layer radially furthest towards the inside of the tread may make it possible to reduce still further the increases in tread temperature and therefore favor the endurance of the tire.

The presence of this additional layer radially furthest towards the inside of the tread may also make it possible to reduce the operating temperature of the tire in the crown region in order to make it possible to lower the rolling resistance of the tire.

The thickness of this additional layer of blended elastomeric compound, measured in the radial direction at the end of the working layer that is radially outermost in a meridian section of the tire, is advantageously between 15% and 25% of the thickness of the complete tread measured, in the radial direction at the end of the working layer that is radially outermost in a meridian section of the tire.

According to an embodiment of the invention, the aforementioned thickness measurements are taken from tires in the new state, which have not been run and therefore exhibit absolutely no tread wear.

BRIEF DESCRIPTION OF DRAWINGS

Further details and advantageous features of the invention will become apparent hereinafter from the description of some embodiments of the invention given with reference to FIGS. 1 to 3 which depict.

For ease of understanding, the figures have not been drawn to scale.

DETAILED DESCRIPTION OF SPECIFIC EMBODIMENTS

Figure 1:
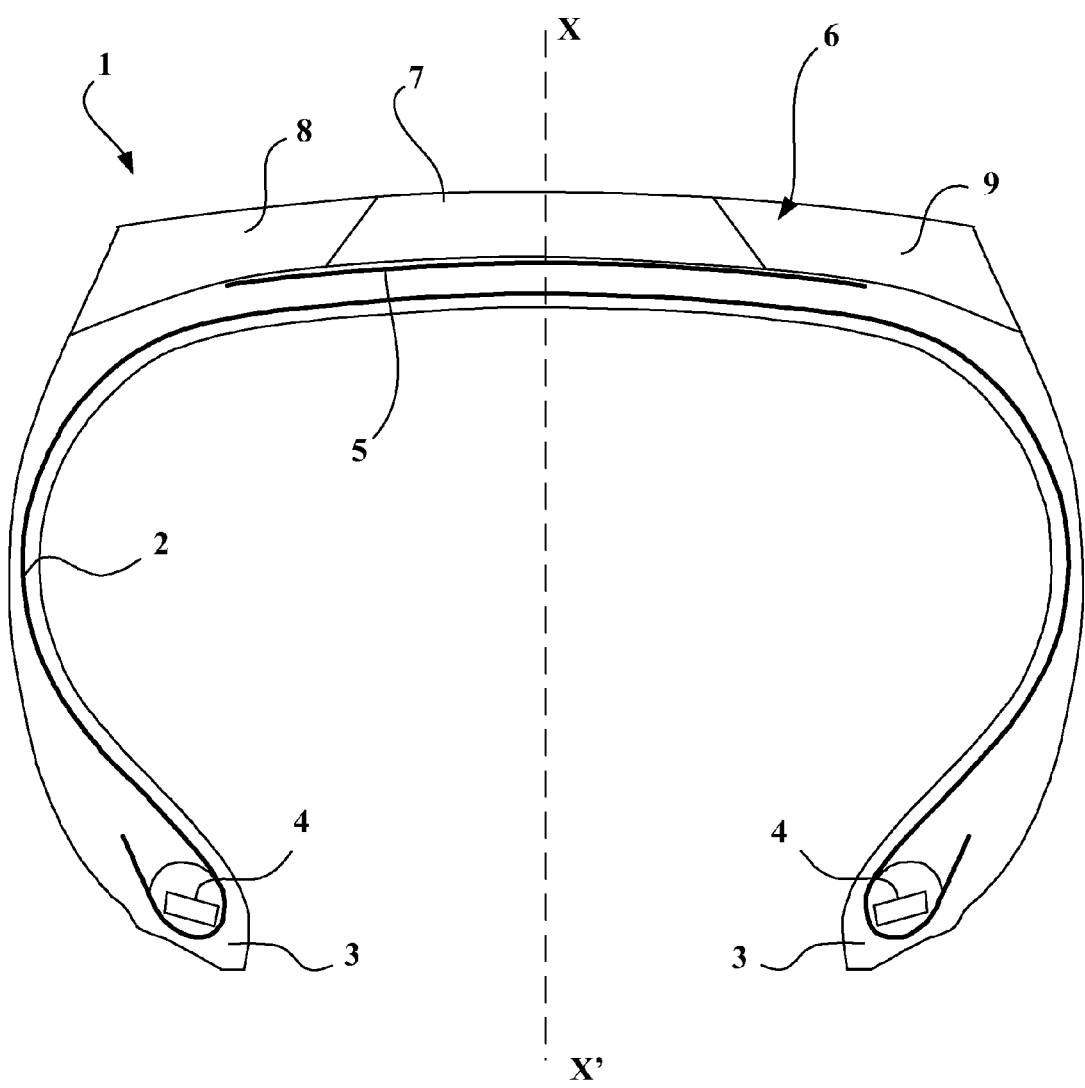
FIG. 1, a diagrammatic meridian section of a tire according to embodiments of the invention, FIG. 2, a diagrammatic meridian view of the tread of the tire of FIG. 1, according to a first embodiment of the invention, FIG. 3, a diagrammatic meridian view of the tread of the tire of FIG. 1, according to a second embodiment of the invention.

FIG. 1 schematically depicts a tire 1 intended to be used on vehicles of the dumper type. It comprises a radial carcass reinforcement 2 anchored in two beads 3 around bead wires 4. The carcass reinforcement 2 is formed of a layer of metal cords. The carcass reinforcement 2 is hooped by a crown reinforcement 5, itself capped by a tread 6. The tread 6 is, according to the invention, made up of a central part 7 extending at least into the region of the equatorial plane XX', and of two axially outer parts 8, 9.

According to an embodiment of the invention, the central part 7 of the tread 6 has a voids ratio (the tread patterns are not depicted in the figures) which is lower than that of the axially outer parts 8 and 9.

Figure 2:
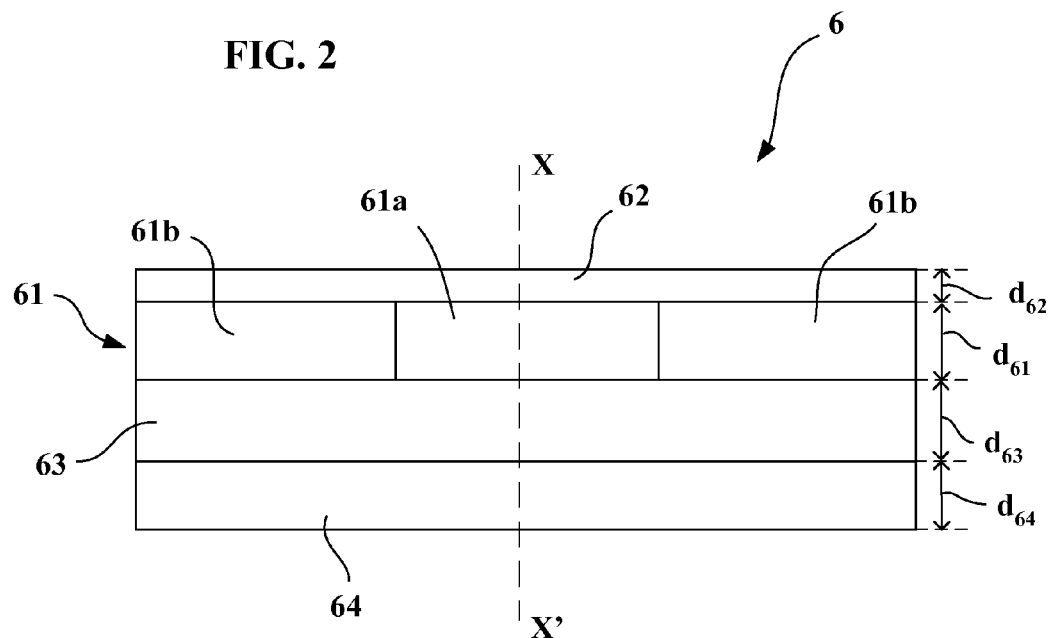
Figure 3:
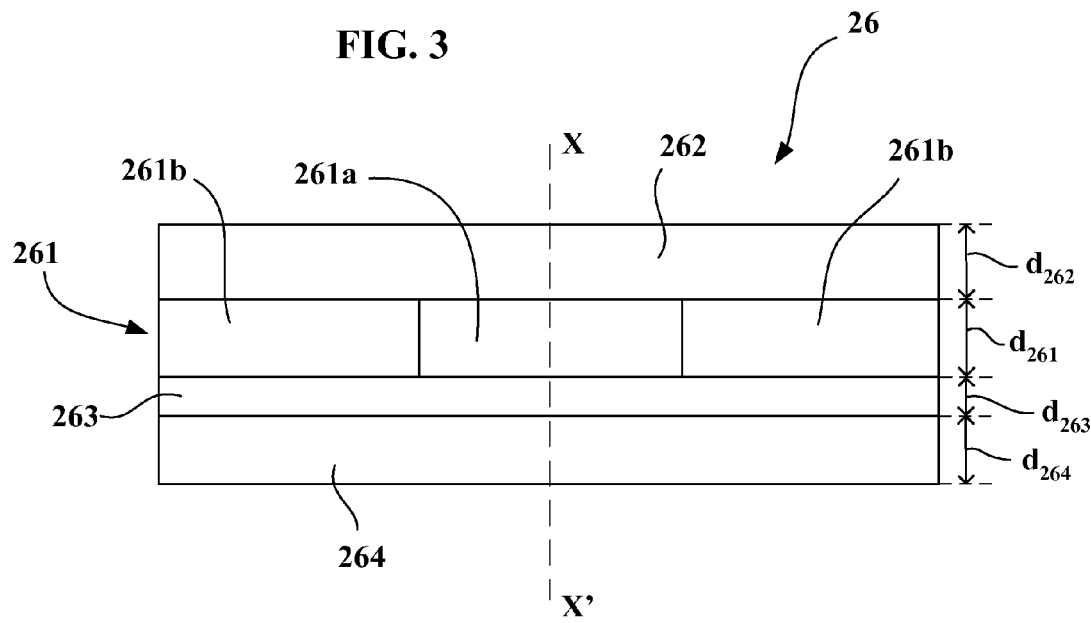

FIGS. 2 and 3 very schematically illustrate the makeup of the tread 6 for two tires of different sizes, the tread 6 being, according to an embodiment of the invention, made up of at least two radially superposed layers of blended elastomeric compound, a first layer of blended elastomeric compound being made up of a first blended elastomeric compound forming a part extending at least in the region of the equatorial plane and of at least two axially outer parts formed of a second blended elastomeric compound.

FIG. 2 schematically depicts the tread 6 of a tire of size 53/80R63.

The voids ratio in the central part of the tread 6 is 3%. The voids ratio in the axially outer parts of the tread 6 is 29%.

According to an embodiment of the invention, the tread 6 is made up of a first layer 61 formed of a first blended elastomeric compound M1 forming a part 61a extending at least into the region of the equatorial plane XX' and of at least two axially outer parts 61b formed of a second blended elastomeric compound M2.

The filled blended elastomeric compound M1 has a macro dispersion Z-value of 80 and a tan (δ) max value of 0.133.

The blended elastomeric compound M2 has a tan (δ) max value of 0.122.

The tread 6 comprises a radially outer second layer 62 that comes into contact with the ground and is made up of the compound M1.

The tread 6 further comprises a radially inner third layer 63 in contact with the first layer 61 made up of the blended compound M2.

The tread 6 also comprises a radially innermost additional layer 64 made up of a blended elastomeric compound M3 with a tan(δ)max value of 0.060.

The compounds M1, M2 and M3 are described in the table below, together with a number of their properties.

|  | Compound M1 | Compound M2 | Compound M3 |
|---|---|---|---|
| NR | 100 | 100 | 100 |
| Black with BET specific area 150 m$^2$/g and structure OAN 135 ml/100 g | 46 | | |
| Black N115 | | 40 | |
| Black N347 | | | 34 |
| Silica 170G | 10 | 15 | 10 |
| Anti-ozone wax C32 ST | 1 | 1 | |
| Antioxidant (6PPD) | 1.5 | 1.5 | 1 |
| Silane on black | | | 2 |
| PEG (6000-20000) | 1.67 | 2.5 | |
| Stearic acid | 1 | 2 | 2 |
| Accelerant CBS | 1.7 | 1.7 | 1.35 |
| Sulphur sol 2H | 1.2 | 1.2 | 1.45 |
| Zinc oxide | 2.7 | 3 | 4.5 |
| Z value | 80 | 54 | 40 |
| tan(δ)$_{max}$ | 0.133 | 0.122 | 0.060 |
| G*1% return | 2.57 | 2.13 | 2.00 |

The thickness $d_{61}$ of the first layer 61 is 64 mm.
The thickness $d_{62}$ of the second layer 62 is 14 mm.
The thickness $d_{63}$ of the third layer 63 is 28 mm.
The thickness $d_{64}$ of the additional layer 64 is 22 mm.

The ratio of the thickness $d_{62}$ of the second layer 62 to the thickness $d_{61}$ of the first layer 61 is 22% and therefore higher than 10%.

The ratio of the thickness $d_{63}$ of the third layer 63 to the thickness $d_{61}$ of the first layer 61 is 44% and therefore higher than 35%.

The ratio of the thickness $d_{64}$ of the additional layer 64 to the total thickness of the tread, namely the sum of the thicknesses ($d_{61}+d_{62}+d_{63}+d_{64}$) is 17% and therefore between 15 and 25%.

The thicknesses are measured on a meridian section of a tire in the new state, in the radial direction at the end of the radially outermost working layer.

FIG. 3 schematically depicts the tread 6 of a tire of size 40.00R57.

The voids ratio in the central part of the tread 6 is 3%. The voids ratio in the axially outer parts of the tread 6 is 33%.

According to an embodiment of the invention, the tread 26 is made up of a first layer 261 formed of a first blended elastomeric compound M21 forming a part 261a extending at least into the region of the equatorial plane XX' and of at least two axially outer parts 261b formed of a second blended elastomeric compound M22.

The tread 26 comprises a radially outer second layer 262 coming into contact with the ground and made up of the compound M21.

The tread 26 also comprises a radially inner third layer 263 in contact with the first layer 261 made up of the compound M22.

The tread 26 also comprises a radially innermost additional layer 264 made up of a blended elastomeric compound M23 a tan(δ)max value of 0.050.

The compounds M21, M22 and M23 are identical to the compounds M1, M2 and M3 corresponding to FIG. 2.

The thickness $d_{261}$ of the first layer 261 is 32 mm.
The thickness $d_{262}$ of the second layer 262 is 46 mm.
The thickness $d_{263}$ of the third layer 263 is 14 mm.
The thickness $d_{264}$ of the additional layer 264 is 22 mm.

The ratio of the thickness $d_{262}$ of the second layer 262 to the thickness $d_{261}$ of the first layer 261 is 140% and therefore higher than 50%.

The ratio of the thickness of $d_{263}$ of the third layer 263 to the thickness $d_{261}$ of the first layer 261 is 44% and therefore higher than 25%.

The ratio of the thickness $d_{64}$ of the additional layer 264 to the total thickness of the tread, namely the sum of the thicknesses ($d_{261}+d_{262}+d_{263}+d_{264}$) is 19% and therefore between 15 and 25%.

As with FIG. 2, the thickness measurements are taken in a meridian section of a tire in the new state, in the radial direction at the end of the radially outermost working layer.

Tests were carried out using vehicles fitted with the tires according to the invention in order to evaluate the wearing properties thereof.

These tests involve running tires fitted to the driven rear axle of a vehicle. The vehicles are driven along a track inclined at 14% successively uphill and downhill for a total duration of 1500 hours. The track is made up of stones ranging in size between 15 and 30 mm.

These tests are carried out on the one hand with tires according to the depiction of FIG. 2, denoted P1 (size 53/80R63) and tires according to the depiction of FIG. 3, denoted P2 (size 40.00R57).

The tires P1 of size 53/80R63 are inflated to a pressure of 7 bar and subjected to a load of 87.5 tonnes.

The tires P2 of size 40.00R57 are inflated to a pressure of 7 bar and subjected to a load of 64.5 tonnes.

These tires are respectively compared against reference tires R1 and R2 fitted respectively to the same vehicles. The tires R1 and R2 are tires which are known for this type of application.

The tires R1 are the same size as the tires P1 and the tires R2 are the same size as the tires P2.

The treads of the reference tires R1 and R2 are produced in identical ways and comprise two radially superposed layers, the radially outer layer being made up of a first material A1 and the radially inner layer being made up of a material A2.

In tire R1, the thickness of the radially outer layer made up of the material A1 is 106 mm and the thickness of the radially inner layer made up of the material A2 is 22 mm.

In tire R2, the thickness of the radially outer layer made up of the material A1 is 92 mm and the thickness of the radially inner layer made up of the material A2 is 22 mm.

The makeup and properties of these materials are described in the table below.

|  | Compound A1 | Compound A2 |
| --- | --- | --- |
| NR | 100 | 100 |
| Black N115 | 40 |  |
| Black N347 |  | 34 |
| Silica 170G | 15 | 10 |
| Anti-ozone wax C32 ST | 1 |  |
| Antioxidant (6PPD) | 1.5 | 1 |
| Silane on black |  | 2 |
| PEG (6000-20000) | 2.5 |  |
| Stearic acid | 2 | 2 |
| Accelerant CBS | 1.4 | 1.35 |
| Sulphur sol 2H | 1.4 | 1.45 |
| Zinc oxide | 3 | 4.5 |
| Z value | 57 | 40 |
| $\tan(\delta)_{max}$ | 0.142 | 0.060 |
| G*1% return | 2.72 | 2.00 |

The results obtained when running under the conditions described hereinabove demonstrated improvements in wear of between 15 and 20% with tires according to an embodiment of the invention as compared against the reference tires.

The results show that the tires according to an embodiment of the invention lead to a better compromise between the various wear and endurance performance aspects, notably as a result of heat dissipation beneficial to the shoulders.

The invention claimed is:

1. A tire with a radial carcass reinforcement, comprising: a crown reinforcement,
itself capped radially by a tread radially capping the crown reinforcement and connected to two beads by two sidewalls, the tread comprising at least two layers of blended elastomeric compounds that are radially superposed and have a voids ratio that is lower in a central part than at axially outer parts, wherein a first layer of blended elastomeric compounds of the tread is made up of a first blended elastomeric compound forming a part extending at least into the region of the equatorial plane and of at least two axially outer parts formed of a second blended elastomeric compound, wherein the first blended elastomeric compound has a macro dispersion Z-value higher than 65 and a maximum $\tan(\delta)$ value, denoted $\tan(\delta)$max, lower than 0.150 at 100° C., and wherein the second blended elastomeric compound has a maximum $\tan(\delta)$ value, denoted $\tan(\delta)$max, lower than 0.130 at 100° C.

2. The tire according to claim 1, wherein the first blended elastomeric compound contains, by way of reinforcing filler, at least carbon black used at a content of between 10 and 70 phr, and wherein the carbon black has a BET specific surface area higher than 140 m²/g.

3. The tire according to claim 1, wherein the first blended elastomeric compound contains, by way of a cut of carbon black, with a BET specific surface area higher than 140 m²/g, and of a white filler, wherein the reinforcing filler is used at a content of between 10 and 90 phr, and wherein the ratio of carbon black to white filler is higher than 2.7.

4. The tire according to claim 1, wherein the complex dynamic shear modulus G*1% at 100° C. of the first blended elastomeric compound is higher than 2.30 MPa.

5. The tire according to claim 1, wherein the first layer of blended elastomeric compound, made up of a first blended elastomeric compound forming a part that extends at least into the region of the equatorial plane and of at least two axially outer parts formed of a second blended elastomeric compound, forms the radially outer layer of the tread.

6. The tire according to claim 5, wherein the at least two layers of blended elastomeric compounds includes a radially inner second layer in contact with the first layer, the radially inner second layer made up of a blended elastomeric compound having a maximum $\tan(\delta)$ value, denoted $\tan(\delta)$max, lower than 0.130 at 100° C.

7. The tire according to claim 1, wherein the at least two layers of blended elastomeric compounds includes a radially outer second layer in contact with the first layer, forming the radially outer layer of the tread, the radially outer second layer made up of a blended elastomeric compound having a macro dispersion Z-value higher than 65 and a maximum $\tan(\delta)$ value, denoted $\tan(\delta)$max, lower than 0.150 at 100° C.

8. The tire according to claim 7, wherein the tread comprises a radially inner third layer in contact with the said first layer, and wherein the blended elastomeric compound that makes up the said third layer has a maximum $\tan(\delta)$ value, denoted $\tan(\delta)$max, lower than 0.130 at 100° C.

9. The tire according to claim 7, wherein the tire is of a dimension less than or equal to 57 inches, wherein the thickness, measured in the radial direction at the end of what in a meridian section of the tire is the radially outermost working layer, of the second layer of blended elastomeric compound is greater than 50% of the thickness, measured in the radial direction at the end of what in a meridian section of the tire is the radially outermost working layer, of the first layer of blended elastomeric compound.

10. The tire according to claim 8, wherein the tire is of a dimension less than or equal to 57 inches, wherein the thickness, measured in the radial direction at the end of what in a meridian section of the tire is the radially outermost working layer, of the third layer of blended elastomeric compound is greater than 25% of the thickness, measured in the radial direction at the end of what in a meridian section of the tire is the radially outermost working layer, of the first layer of blended elastomeric compound.

11. The tire according to claim 7, wherein the tire is of a dimension strictly greater than 57 inches, wherein the thickness, measured in the radial direction at the end of what in a meridian section of the tire is the radially outermost working layer, of the second layer of blended elastomeric compound is greater than 10% of the thickness, measured in the radial direction at the end of what in a meridian section of the tire is the radially outermost working layer, of the first layer of blended elastomeric compound.

12. The tire according to claim 8, wherein the tire is of a dimension strictly greater than 57 inches, wherein the thickness, measured in the radial direction at the end of what in a meridian section of the tire is the radially outermost working layer, of the third layer of blended elastomeric compound is greater than 35% of the thickness, measured in the radial direction at the end of what in a meridian section of the tire is the radially outermost working layer, of the first layer of blended elastomeric compound.

13. The tire according to claim 1, wherein the tire further comprises an additional layer of a blended elastomeric compound in a radially innermost position of the tread, and wherein the blended elastomeric compound of the said additional layer has a maximum $\tan(\delta)$ value, denoted $\tan(\delta)$max, lower than 0.100 at 100° C.

14. The tire according to claim 8, wherein the tire is of a dimension less than or equal to 57 inches, wherein the thickness, measured in the radial direction at the end of what in a meridian section of the tire is the radially outermost working layer, of the second layer of blended elastomeric compound is greater than 50% of the thickness, measured in the radial direction at the end of what in a meridian section of the tire is the radially outermost working layer, of the first layer of blended elastomeric compound.

15. The tire according to claim 8, wherein the tire is of a dimension strictly greater than 57 inches, wherein the thickness, measured in the radial direction at the end of what in a meridian section of the tire is the radially outermost working layer, of the second layer of blended elastomeric compound is greater than 10% of the thickness, measured in the radial direction at the end of what in a meridian section of the tire is the radially outermost working layer.

\* \* \* \* \*